US012497277B2

(12) United States Patent
McVicar et al.

(10) Patent No.: US 12,497,277 B2
(45) Date of Patent: Dec. 16, 2025

(54) FORKLIFT REACH MECHANISMS

(71) Applicant: Combilift, County Monaghan (IE)

(72) Inventors: Martin McVicar, County Monaghan (IE); Robert Moffett, County Monaghan (IE); Mark Whyte, County Monaghan (IE)

(73) Assignee: COMBILIFT, Annahagh (IE)

( * ) Notice: Subject to any disclaimer, the term of this patent is extended or adjusted under 35 U.S.C. 154(b) by 373 days.

(21) Appl. No.: 18/042,237

(22) PCT Filed: Aug. 16, 2021

(86) PCT No.: PCT/EP2021/072670
§ 371 (c)(1),
(2) Date: Feb. 20, 2023

(87) PCT Pub. No.: WO2022/038071
PCT Pub. Date: Feb. 24, 2022

(65) Prior Publication Data

US 2023/0312316 A1 Oct. 5, 2023

(30) Foreign Application Priority Data

Aug. 20, 2020 (GB) ...................................... 2012974

(51) Int. Cl.
*B66F 9/12* (2006.01)
*B66F 9/14* (2006.01)
(Continued)

(52) U.S. Cl.
CPC .............. *B66F 9/122* (2013.01); *B66F 9/148* (2013.01); *B66F 9/16* (2013.01); *B66F 9/19* (2013.01)

(58) Field of Classification Search
CPC .. B66F 9/122; B66F 9/16; B66F 9/148; B66F 9/19; B66F 9/146; B66F 9/10
See application file for complete search history.

(56) References Cited

U.S. PATENT DOCUMENTS 9,994,435 B2 * 6/2018 Hasler ........................ B66F 9/10
10,501,296 B2 * 12/2019 O'Keeffe ................ B66F 9/122
(Continued)

FOREIGN PATENT DOCUMENTS

| | | |
|---|---|---|
| GB | 2526356 | 11/2015 |
| GB | 2575826 | 1/2020 |
| WO | 2017/001507 | 1/2017 |

OTHER PUBLICATIONS

International Search Report issued in co-pending application No. PCT/EP2021/072670 on Mar. 1, 2022.

*Primary Examiner* — Mark C Hageman
(74) *Attorney, Agent, or Firm* — Whiteford, Taylor & Preston, LLP; Gregory M. Stone

(57) ABSTRACT

A forklift reach mechanism (10) has a main support (16) connected between a carriage (14) and a set of forks (48). The carriage is moveable vertically on a mast (12). The main support is lifted by a connecting member (32) that depends from an articulated levelling assembly comprising a pair of arms (22, 24) connected pivotally together and connected at their other ends to the mast and carriage respectively. The levelling assembly causes the distal end of the main support, on which the forks are mounted, to travel horizontally towards or away from the mast as the carriage is raised or lowered. The reach mechanism is operated by an extensible actuating member (36) such as a hydraulic cylinder that acts between the carriage and the connecting member, providing a strong and compact reach mechanism.

13 Claims, 10 Drawing Sheets

(51) Int. Cl.

| | |
|---|---|
| ***B66F 9/16*** | (2006.01) |
| ***B66F 9/19*** | (2006.01) |

(56) References Cited

U.S. PATENT DOCUMENTS

| | | | | |
|---|---|---|---|---|
| 11,926,514 | B1 * | 3/2024 | O'Keeffe | B66F 9/125 |
| 2020/0055713 | A1 * | 2/2020 | Turnbull | B66F 9/122 |

* cited by examiner

FORKLIFT REACH MECHANISMS

TECHNICAL FIELD

This invention relates to a forklift reach mechanism such as, may be carried on a forklift truck.

In particular the invention relates to reach mechanisms which allow the forklift assembly to be extended and retracted relative to a mast on which the reach mechanism is mounted.

BACKGROUND ART

Reach mechanisms are particularly useful in unloading a vehicle, by allowing the forks to be extended into and retracted from the vehicle interior without moving the wheels of the forklift truck.

A number of pantograph mechanisms exist to provide a reach forklift. It is an object of this invention to provide an alternative mechanism providing increased strength and stability relative to known reach mechanisms.

DISCLOSURE OF THE INVENTION

Accordingly there is provided a forklift reach mechanism comprising:

a vertical mast;

a carriage that is movable vertically along the mast;

a main support connected at a proximal end thereof to the carriage at a first pivoting connection and connected at a distal end thereof to a forklift assembly;

a levelling assembly comprising upper and lower arms pivotally connected at their distal ends, wherein the proximal end of the upper arm is connected to the carriage at a second pivoting connection, and the proximal end of the lower arm is connected at a fixed location relative to the mast below the carriage;

a connecting member connected at one end to the levelling assembly adjacent the connection between the upper and lower arms, and at another end to the main support at an intermediate point along the main support between the proximal and distal ends thereof;

an extensible actuating member connected between the carriage and the connecting member;

wherein the first pivoting connection is below the second pivoting connection on the carriage;

wherein the actuating member can be extended or retracted to drive the carriage vertically along the mast, thereby drawing the forklift assembly towards or away from the mast.

The mechanism provides a strong geometry with a compact size, the extensible actuating member (e.g. a hydraulic reach cylinder) being mounted in a compact fashion between the carriage and the connecting member.

The mechanism also allows for a much shorter stroke length to raise and lower the carriage along a given height of the mast as compared with a hydraulic ram acting directly on a carriage to drive it up and down as has been proposed in prior art mechanisms.

Preferably, the mechanism further comprises a secondary support connected at a distal end to the forklift assembly above the connection with the main support, and connected at a proximal end to one of the carriage, the levelling assembly or the connecting member, the secondary support being extensible and retractable to thereby tilt the forklift assembly by the relative movement between the connection points on the forklift assembly for the main and secondary supports.

This allows a tilt mechanism to be combined with the structural support of the fork assembly, and integrates the tilt mechanism into the pantograph-like reach mechanism, reducing the number of components and the complexity of the system (i.e. no tilting of the carriage is needed).

Further, preferably, the secondary support is pivotally connected at both proximal and distal ends such that it has freedom to pivot both vertically and laterally, allowing the forklift assembly to be shifted sideways relative to the carriage.

The secondary support is preferably provided by one or more tilt cylinders that run parallel to and above the main support.

Such tilt cylinder(s) are by virtue of their positioning always in tension, allowing them to be lighter and less prone to buckling than any tilt cylinder arrangement where the tilt cylinders are sometimes in compression.

Preferably the connection between the distal end of the main support and the forklift assembly is a sliding connection allowing the forklift assembly to slidably move laterally relative to the main support.

Preferably, the mechanism further comprises a side shift actuator operable between the main support and the forklift to shift the forklift assembly laterally relative to the main support along the sliding connection.

The integration of a side shift actuator into the forklift assembly allows for a more compact and simpler side shift than in conventional systems.

Preferably, a quadrilateral geometry is defined by the four points comprising (a) the first pivoting connection, (b) the second pivoting connection, (c) the connection between the upper arm and the connection member, and (d) the connection between the connecting member and the main support; wherein each of the distances (a)-(b), (b)-(c), (c)-(d) and (d)-(a) is fixed; and wherein the actuation of the extensible actuating member causes the angles at points (a) and (c) to open while the angles at points (b) and (d) close, or vice versa, with the lower arm restraining point (c) to follow an arcuate path relative to the fixed location at which it connects relative to the mast.

Preferably, the upper and lower arms form a V-shaped assembly whose apex is at the point where the upper and lower arms meet, and wherein the actuation of the extensible actuating member causes the angle at the apex to respectively open or close as the carriage moves up or down the mast.

In an independent further aspect of the invention, there is provided a forklift reach mechanism comprising:

a vertical mast;

a carriage that is movable vertically along the mast;

a main support connected at a proximal end thereof to the carriage and connected at a distal end thereof to a forklift assembly;

a levelling assembly connected between the carriage and the mast and to which the main support is connected at an intermediate point between the proximal and distal ends, the levelling assembly being movable to restrain the main support such that as the carriage and the proximal end of the main support are raised and lowered, the distal end of the main support extends and retracts along a generally horizontal path;

a secondary support connected at a distal end to the forklift assembly above the connection with the main support, and connected at a proximal end to one of the carriage and the levelling assembly, the secondary support being extensible and retractable to thereby tilt the forklift assembly by the relative movement between the connection points on the forklift assembly for the main and secondary supports.

Preferably, the levelling assembly comprises a pair of articulated arms connected at their respective proximal ends to the carriage and a fixed point relative to the mast, respectively, and connected to one another at their distal ends.

Preferably, the levelling assembly further comprises a connecting member that connects the main support to the pair of articulated arms adjacent the connection between the distal ends of the arms.

Preferably, the secondary support is pivotally connected at both proximal and distal ends with freedom to pivot both vertically and laterally, allowing the forklift assembly to be shifted sideways relative to the carriage.

Preferably, the connection between the distal end of the main support and the forklift assembly is a sliding connection allowing the forklift assembly to slidably move laterally relative to the main support.

Preferably, the forklift reach mechanism further comprises a side shift actuator operable between the main support and the forklift to shift the forklift assembly laterally relative to the main support along the sliding connection.

BRIEF DESCRIPTION OF THE DRAWINGS

The invention will now be illustrated by the following description of embodiments thereof, with reference to the accompanying drawings, in which.

DETAILED DESCRIPTION OF PREFERRED EMBODIMENTS

Figure 3:
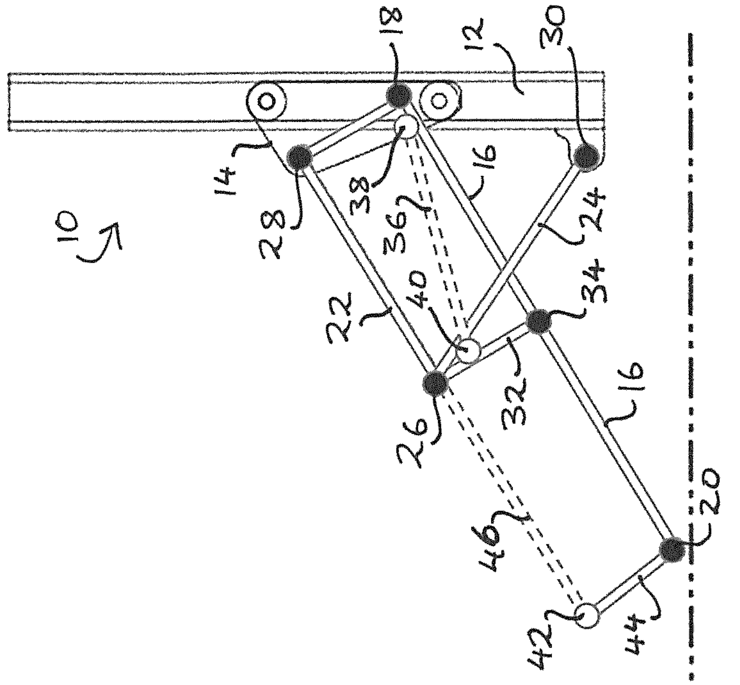
FIGS. 1-3 are schematic representations of a forklift reach mechanism, in retracted, semi-extended, and extended states, respectively.
Figure 2:
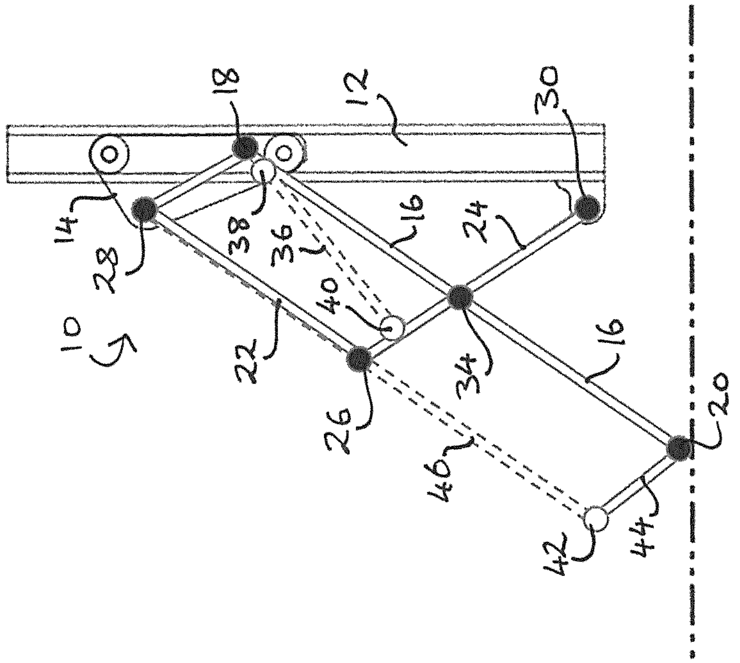
Figure 1:
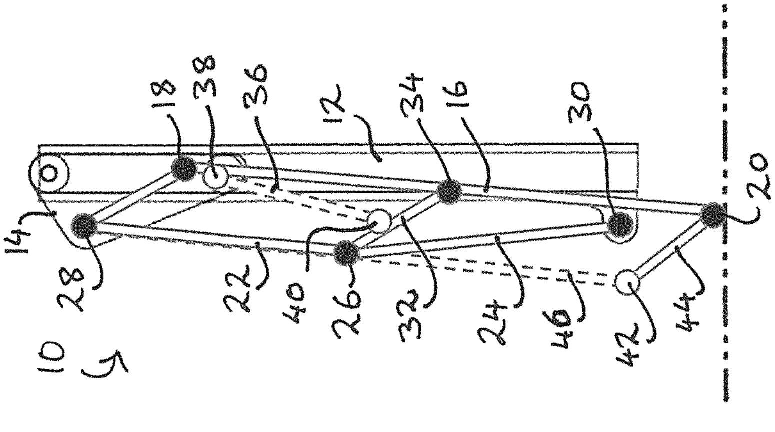

In FIGS. 1-3 there is indicated, generally at 10, a forklift reach mechanism shown in three different states. In FIG. 1 the mechanism is shown in a retracted state; in FIG. 2 it is shown in a partially extended state; and in FIG. 3 it is shown in a fully extended state.

The mechanism of FIG. 1 is shown in simplified form as a geometry of connected members and connection points, mounted on a mast 12 and a carriage 14 which is vertically moveable along the mast 12. Connecting members shown in solid lines are of fixed length in this embodiment, while those shown in broken lines are extendable and retractable (e.g. using hydraulic cylinders).

A main support 16 is connected at its proximal end (i.e. the end nearest the carriage) to a first pivoting connection 18 on the carriage 14, and at its distal end (i.e. the end furthest from the carriage) to a pivoting connection 20 on a forklift assembly (not shown but represented by a connecting member 44 that forms part of a forklift carriage).

A V-shaped levelling assembly is provided by an upper arm 22 and a lower arm 24 connected to one another at their respective distal ends (at the apex of the "V" shape) at a pivoting connection 26. As seen moving from FIG. 1 to FIG. 2 to FIG. 3, the V shape can move from an open angle to a closed angle, i.e. the internal angle at the apex becomes more acute between FIGS. 1 and 3. The upper arm is connected at its proximal end to the carriage at a second pivoting connection 28 which is positioned above the first pivoting connection 18 on the carriage. The proximal end of the lower arm is connected using a pivoting connection 30 at a fixed location relative to the mast 12, below the carriage.

A connecting member 32 (not visible in FIG. 2 as it is hidden behind a portion of the lower arm 24) is connected at one end to the levelling assembly at or adjacent the connection 26 between the upper and lower arms, and at another end to the main support 16 at an intermediate point 34 along the main support between the proximal and distal ends of the main support.

It can be seen that a quadrilateral geometry is defined by the four points comprising (a) the first pivoting connection 18, (b) the second pivoting connection 28, (c) the connection 26 between the levelling assembly and the connection member 32, and (d) the connection 34 between the connecting member 32 and the main support 16.

Each of the distances 18-28, 28-26, 26-34, and 34-18 is fixed, and the preferred geometry of this quadrilateral is approximately that of a parallelogram (hence the distance of the connection 34 on the main support is chosen to be approximately the same distance from the first pivoting connection 18 as the length of the upper arm 22).

An extensible actuating member 36 is connected between the carriage at a connection 38 and the connecting member 32 at a connection 40. The actuating member can be extended (FIG. 3) or retracted (FIG. 1) to drive the carriage vertically along the mast, thereby drawing the forklift assembly 44 towards or away from the mast.

It is the action of this actuation member 36 that changes the geometry of the quadrilateral previously described, to implement the reach function shown in the transition between FIGS. 1-3.

The actuation member 36 only requires a very short stroke length to fully raise or lower the carriage, i.e. the length changes by approximately 25% in a complete traversal of the carriage along the mast. This allows for a significantly more compact mechanism than one which must act directly on the carriage.

It can be seen from the heavy broken line across FIGS. 1-3 that this extension and retraction draws the forklift assembly in a generally horizontal line towards or away from the mast, keeping the load level.

A secondary support 46 is connected at its proximal end to the carriage above the first pivoting connection. This pivoting connection is hidden in FIGS. 1-3, as is the proximal half of the secondary support 46 behind the upper arm 22, but the proximal pivoting connection is approximately coaxial with the second pivoting connection 28 in this embodiment. At its distal end, the secondary support is connected to the forklift assembly 44 above the connection 20 with the main support 16.

While the secondary support 46 in this embodiment is extensible-retractable, no extension or retraction occurs in the transition between FIGS. 1-3. The secondary remains at a fixed length in these figures, and as will be appreciated from these drawings and as described further below, the purpose of the variable length of this secondary support is to enable a tilt mechanism for the forklift assembly, allowing e.g. member 44 to be tilted about the pivoting connection 20 as the secondary support is shortened or lengthened.

The actuation of the extensible actuating member 36 causes the angles at pivoting connection points 28 and 34 to open while the angles at pivoting connection points 18 and 26 close, or vice versa.

The lower arm restrains pivoting connection 26 to follow an arcuate path relative to the fixed location at which it connects relative to the mast. The connecting member 32 draws the connecting point 34 on the main support downwards and outwards as a result, implementing the reach function.

Figure 4:
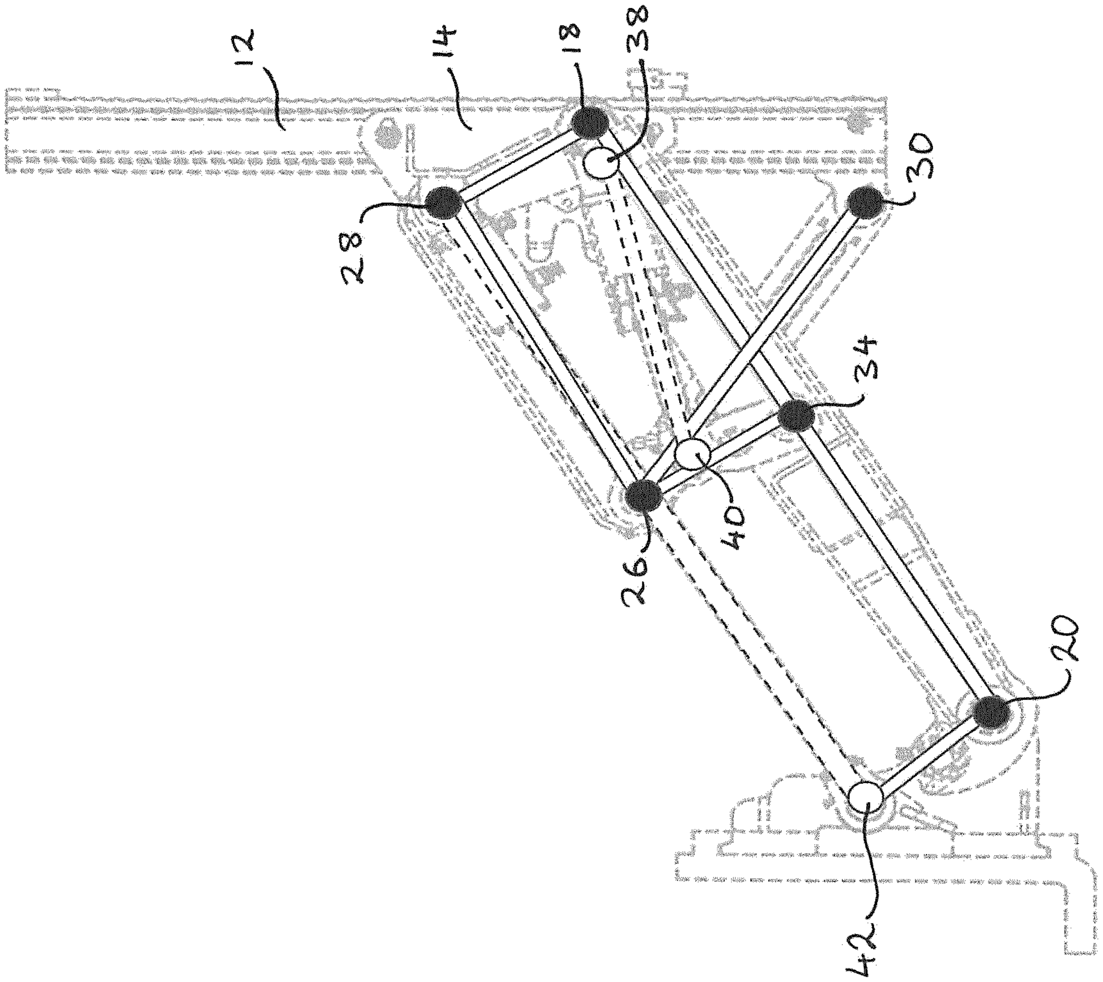
FIG. 4 shows an overlay of the schematic representation of FIG. 3 onto an actual forklift reach mechanism.

FIG. 4 shows the geometric layout from FIG. 3 overlaid on a ghosted and partially cutaway forklift reach mechanism. In FIG. 4, the mast 12 and carriage 14 are identified, as are each of the pivoting connections 18, 20, 26, 28, 30, 34, 38, 40 and 42. The connecting members are shown but for clarity are not identified with reference numerals, to allow the underlying components to be seen.

Figure 5:
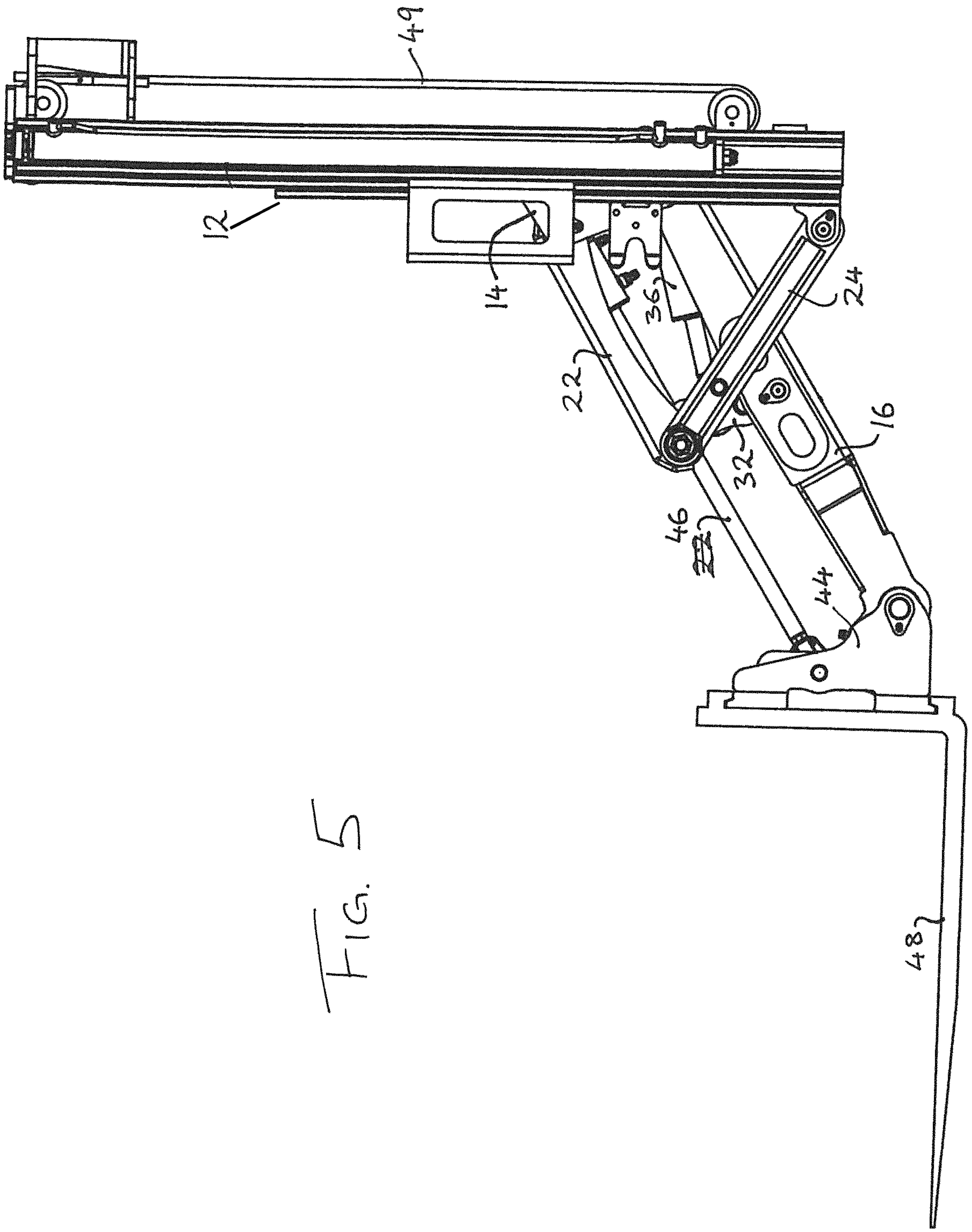
FIG. 5 is a side view of the mechanism of FIG. 4, in the extended state.
Figure 6:
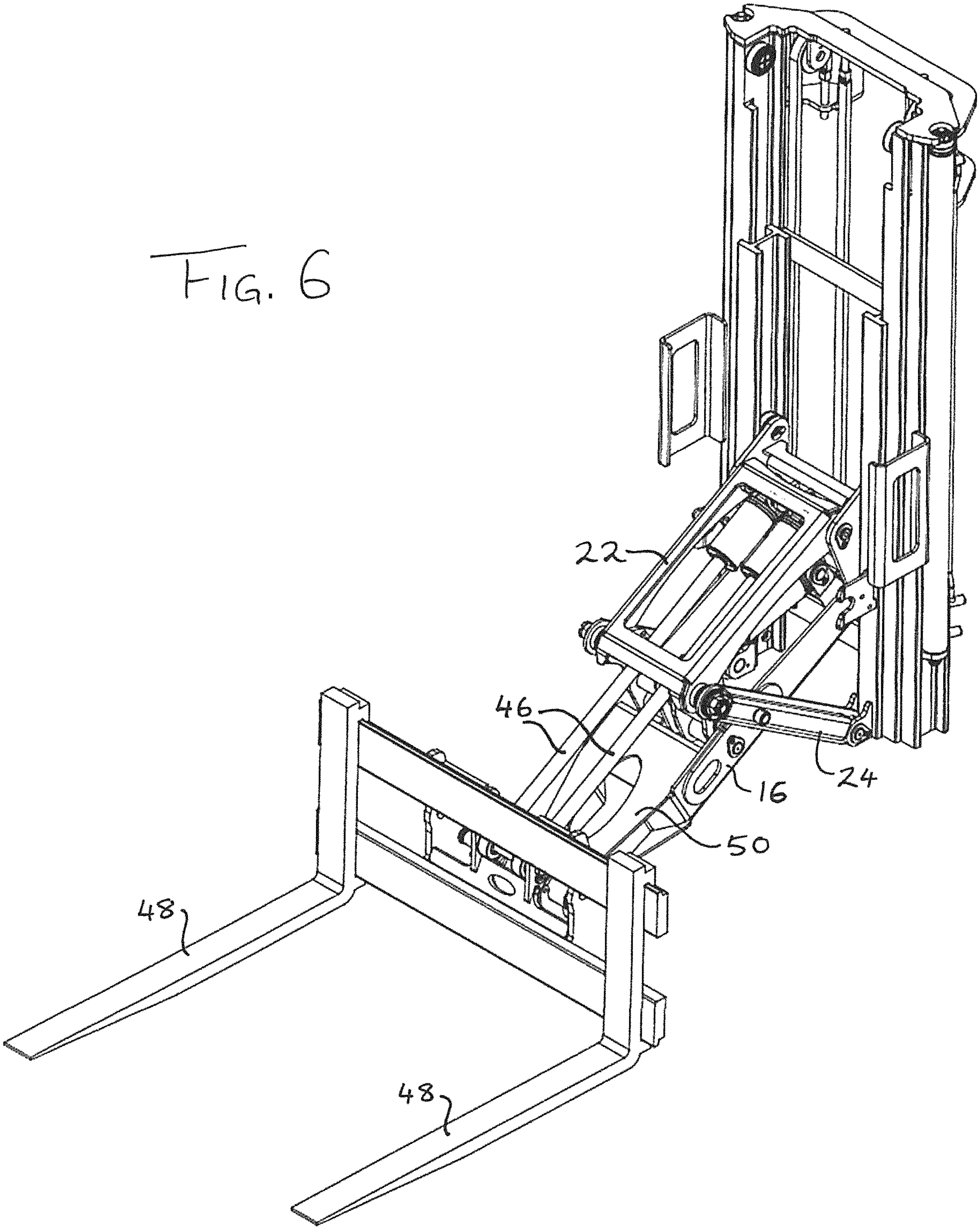
FIG. 6 is a front perspective view of the mechanism of FIG. 5.
Figure 7:
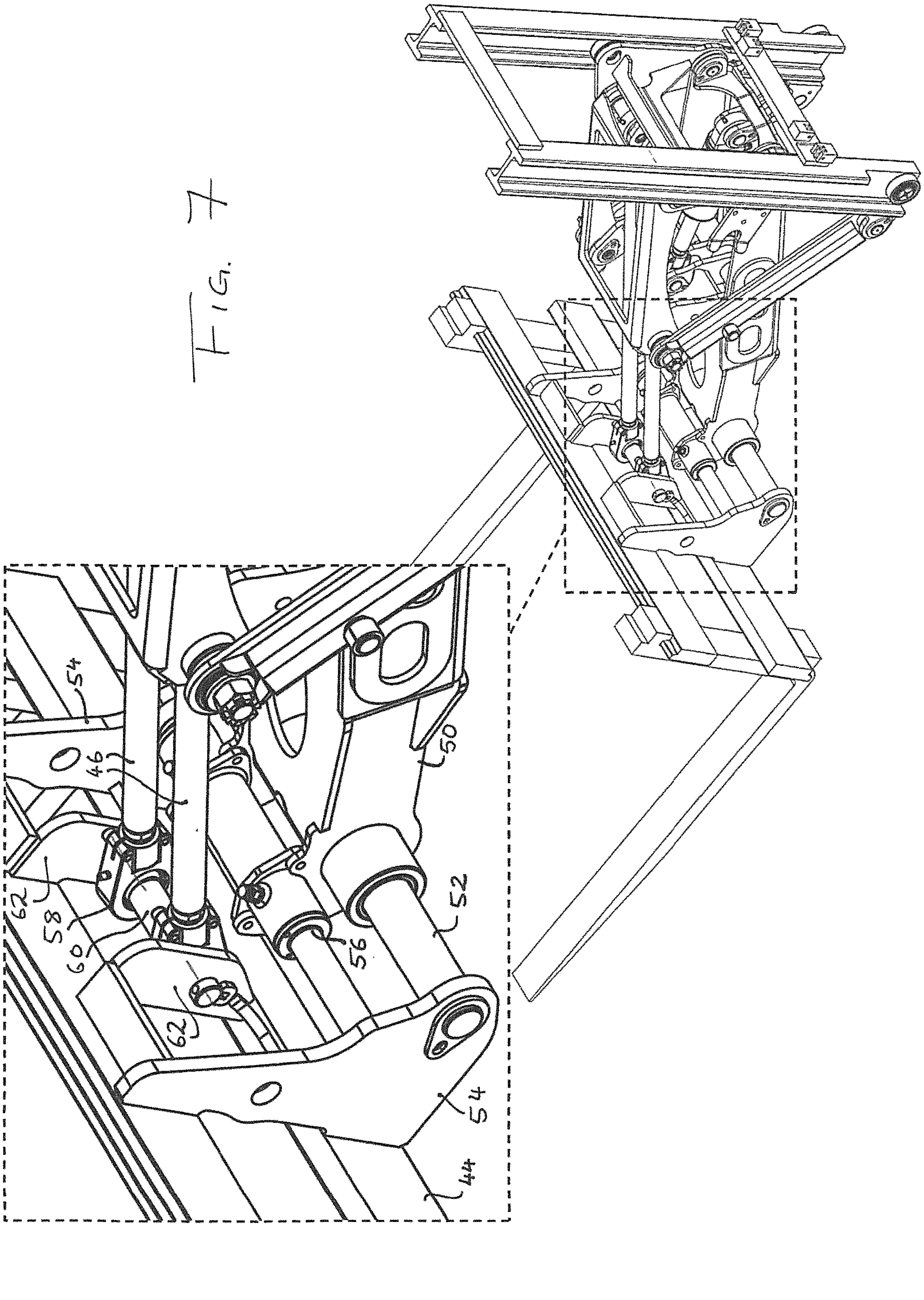
FIG. 7 is a rear perspective view of the mechanism of FIG. 5, with an enlarged detail of the mounting of the forklift assembly.

The ghosted mechanism of FIG. 4 is shown in full detail in FIGS. 5-7 in side, front perspective and rear perspective views, respectively. The same reference numerals as in FIGS. 1-3 will be used to refer to actual components in this mechanism where appropriate.

Thus, in FIG. 5 there is seen the mast 12 and carriage 14. The main support 16 runs from the carriage 14 to the forklift assembly 44 which is shown with forks 48 visible. The upper arm 22 and lower arm 24 form a levelling assembly to which the connecting member 32 is connected at one end, the other end being connected to the main support 16. The forklift assembly is in the extended reach position due to the extension of the hydraulic cylinder 36 serving as the extensible actuating member.

The mast 12 shown in FIG. 5 is a reach mast, used for the raising and lowering of the carriage 14 as the forks 48 are retracted or extended. This mast 12 is carried on a lift mast (not shown) with a chain drive 49 provided to raise and lower the reach mast 12 relative to the lift mast on which the chain drive 49 is mounted. Thus the chain drive 49 is used to lift and lower the forks themselves, both in the extended reach position and in the retracted position (seen in FIGS. 12-14).

FIG. 6 shows that the upper arm is a rectangular frame member with pivot points at each of the four corners, while the lower arm is provided by a pair of arms 24, one at each side (only one visible in FIG. 6).

The main support 16 comprises a pair of arms, one at each side (only one visible in FIG. 6), a and a bridging structure 50 reinforcing and connecting the two sides and coupling the main support to the forklift assembly as detailed further in FIG. 7.

The secondary support 46 is provided by a pair of hydraulic tilt cylinders parallel to one another and disposed more centrally than the main support arms 16. These cylinders can be extended and retracted in order to tilt the forklift assembly relative to the main support and mast.

The tilt cylinders 46, being mounted above the main support 16, are in tension rather than in compression, which reduces the required size (a cylinder that is in compression generally needs to be heavier and thicker to prevent buckling).

Referring to FIG. 7, the coupling of the main and secondary supports to the forklift assembly can be seen.

The main support bridging structure 50 receives a journaled shaft 52 mounted between a pair of brackets 54 carried on the rear of the forklift assembly 44. The shaft 52 is free to slide laterally within the main support bridging structure 50, so that the forklift assembly can be shifted sideways relative to the main support.

The shifting force is applied and controlled by a hydraulic side shift cylinder 56 which couples the main support bridging structure 50 to the bracket 54.

In order to accommodate the sideward motion, the tilt cylinders 46 are each provided with a spherical bearing 58 mounted on a shaft 60 running between two inner brackets 62. Similar bearings are provided at the proximal ends to mount the tilt cylinders to the carriage.

Figure 9:
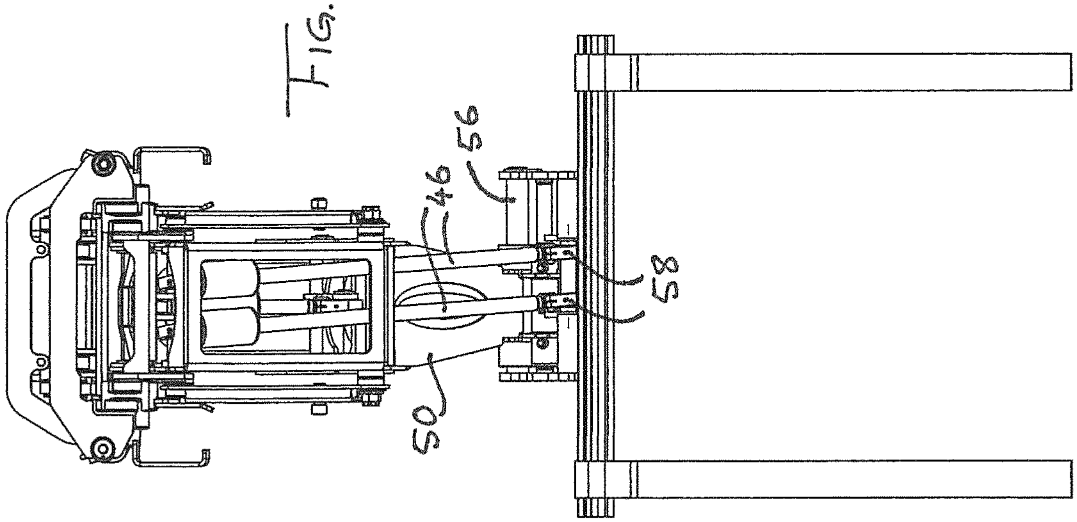
FIGS. 8 and 9 are top plan views of the mechanism of FIG. 5, with side shift moving the forklift assembly left and right, respectively.
Figure 8:
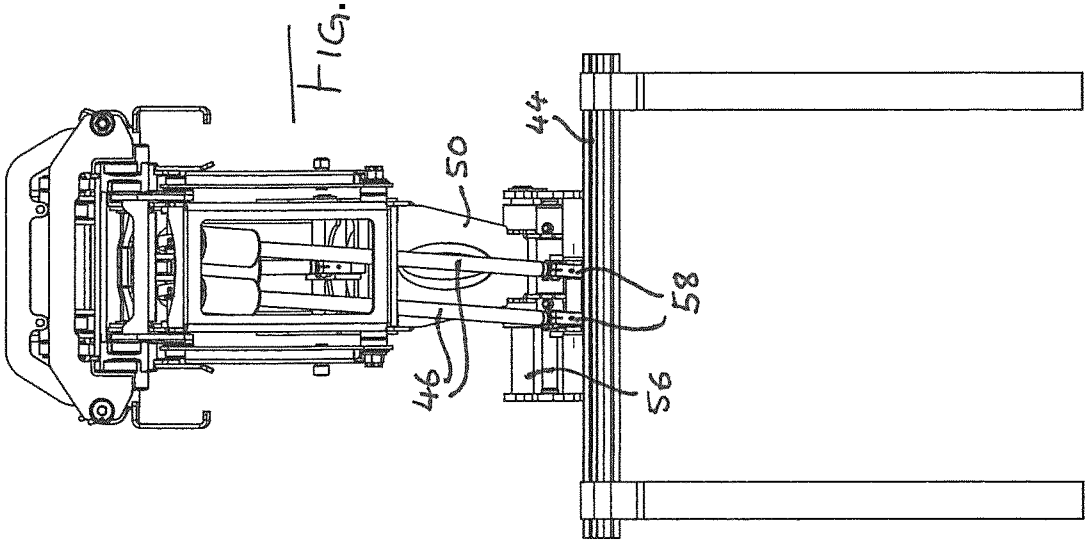

As seen with reference to FIGS. 8 and 9, in this way the main support bridging structure 50 remains static during side shift, and the forklift assembly 44 translates sideways under the action of the hydraulic side shift cylinder 56, with the distal ends of the tilt cylinders 46 being carried sideways with the forklift assembly and accommodating a lateral pivoting motion at the spherical bearings 58. The forklift assembly can thereby be displaced to the left (when seen from above as in FIG. 8) or right (FIG. 9), regardless of whether the reach mechanism is extended or retracted, and regardless of tilt (although the tilt cylinders will compensate for the side shift by extending a corresponding small amount to accommodate the side shift increasing the distance to the carriage).

The side shift is integrated into the forklift assembly, and close to the fork hanging position on the main support, which reduces the stress on this side shift cylinder. This also allows the mast to remain static during the side shift, meaning that the mast can abut against the side of a vehicle during loading and unloading, increasing stability when a heavy lift needs to be side shifted, particularly with the reach mechanism at full extension.

Figure 10:
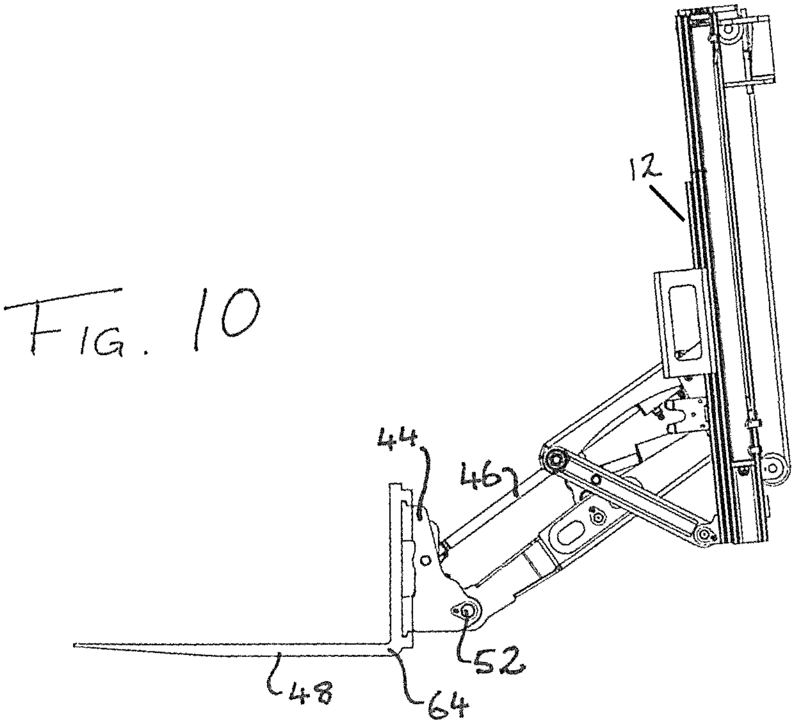
FIGS. 10 and 11 are side views of the mechanism of FIG. 5, with the tilt function engaged to tilt the forks back and forward, respectively.
Figure 11:
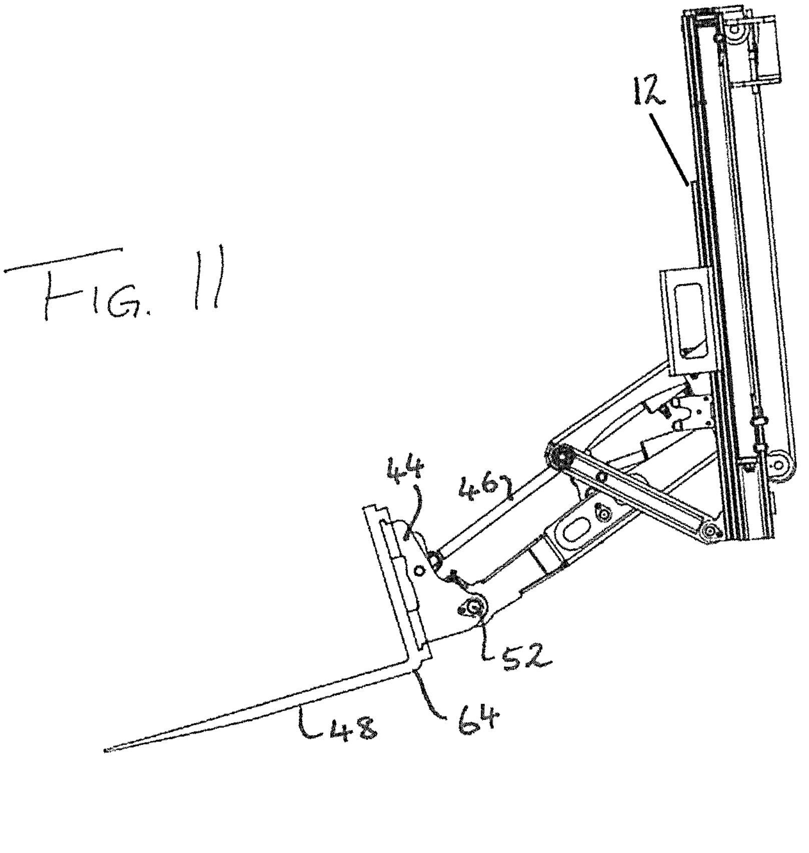

Referring to FIGS. 10 and 11 the mechanism is shown with the forks 48 tilted back (FIG. 10) and forward (FIG. 11). This is accomplished by retracting and extending the tilt cylinders 46 which provide the secondary support to the forklift assembly.

It can be seen that tilting is thereby integrated into and a function of the supporting connections between the forklift assembly and the mast. Because the tilt cylinders carry part of the load, they remain in tension at all times.

It can be seen that the point of support between the main support and the forklift assembly, at the journaled shaft 52, is very close to the heel 64 of the forks (i.e. the 90-degree internal angle at the proximal end of the forks). This reduces the load moment as the load is tilted backwards (FIG. 10), i.e. the load comes closer to the mast as it is tilted back.

Figure 13:
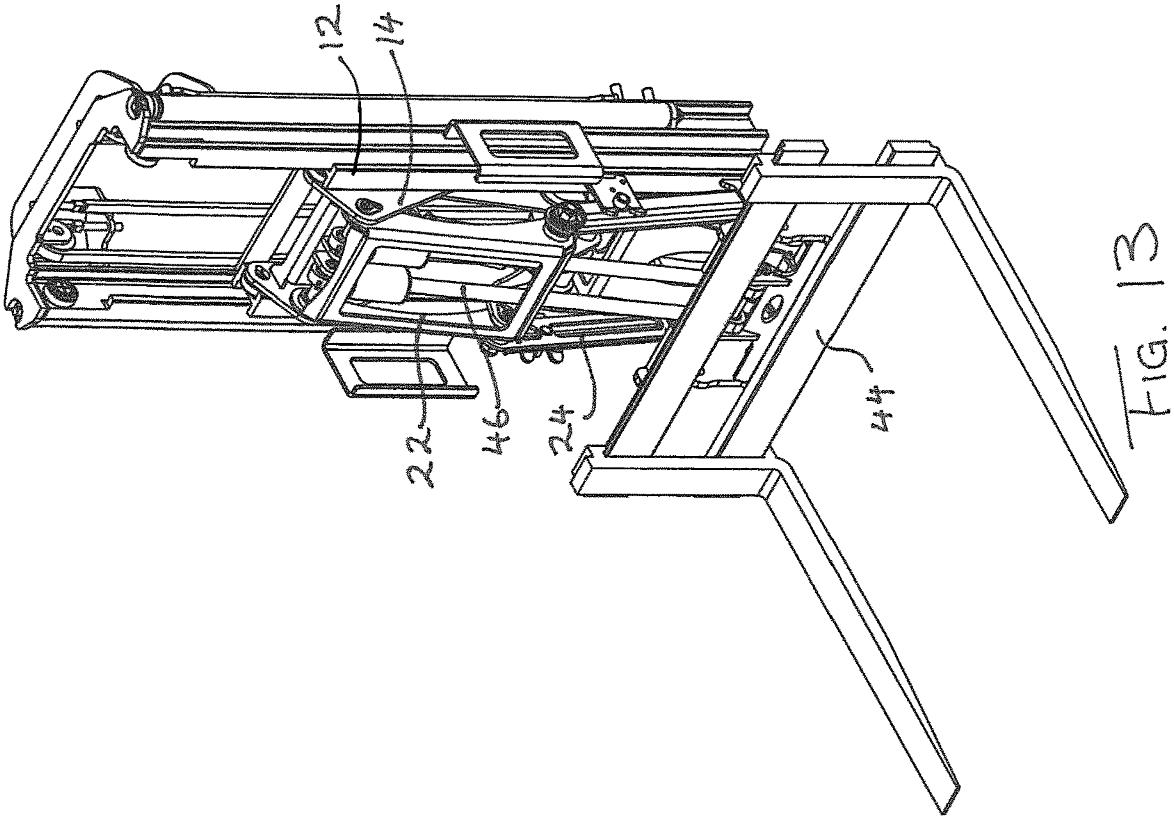
FIGS. 12-14 are side, front perspective and rear perspective views, respectively, of the mechanism of FIG. 5 in the retracted state.
Figure 12:
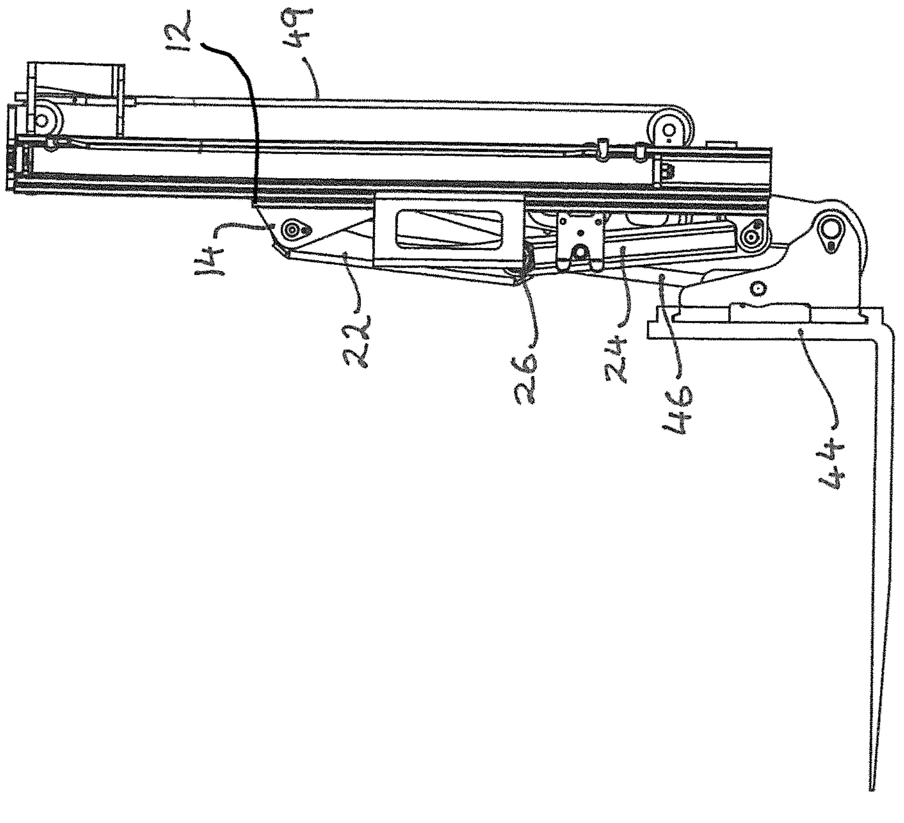
Figure 14:
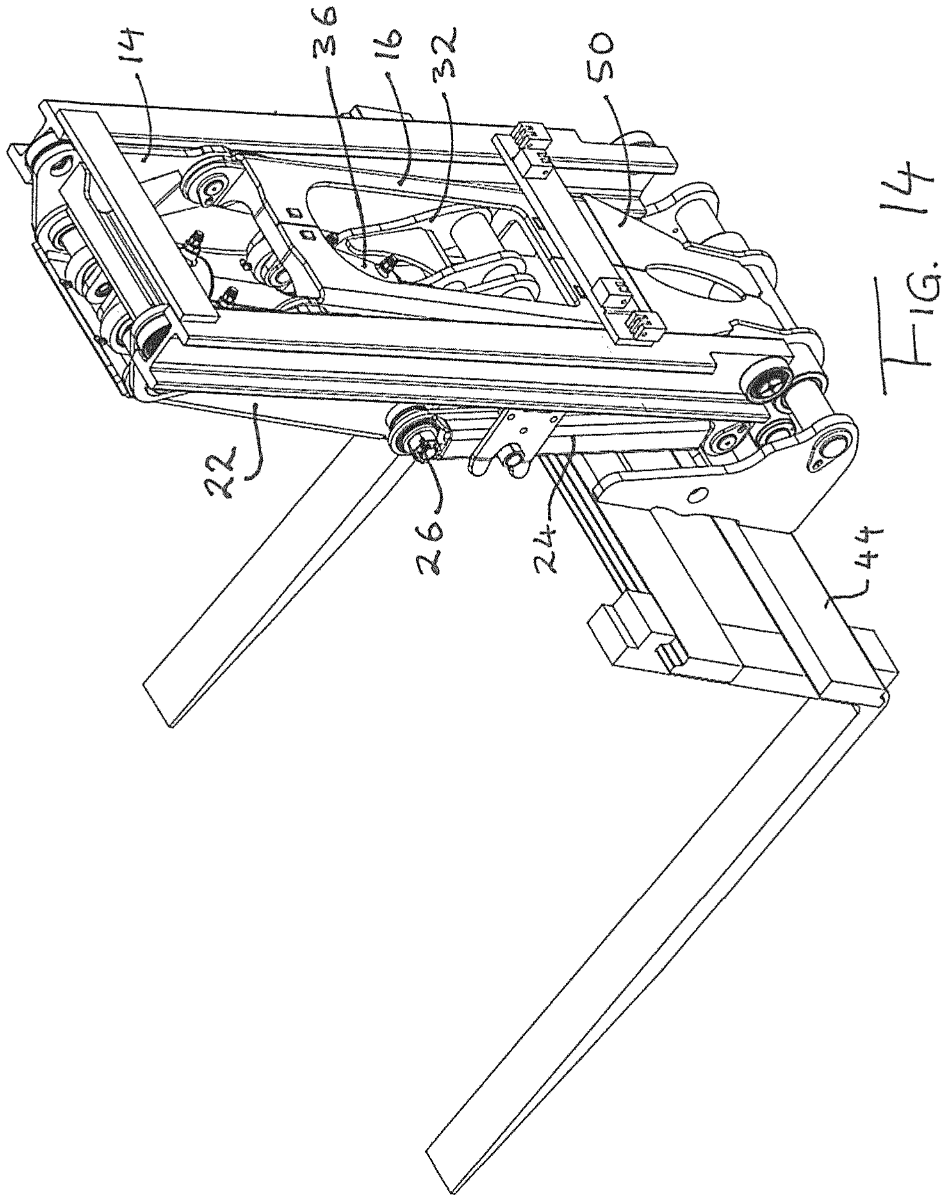

FIGS. 12-14 show the same forklift reach mechanism when the forklift assembly 44 is in the retracted position. The carriage 14 has been raised due to the retraction of the hydraulic cylinder 36 (extensible actuating member) just visible in FIG. 14, which has drawn the midpoint of the connecting member 32 towards the carriage 14. The levelling assembly, comprising upper and lower arms 22, 24 and the pivoting connection 26, has been drawn inwards, with the internal angle at the pivoting connection becoming more obtuse. The main support 16, 50 has been drawn upwards and almost parallel with the mast 12, thereby pulling the forklift assembly 44 back to the mast.

Figure 15:
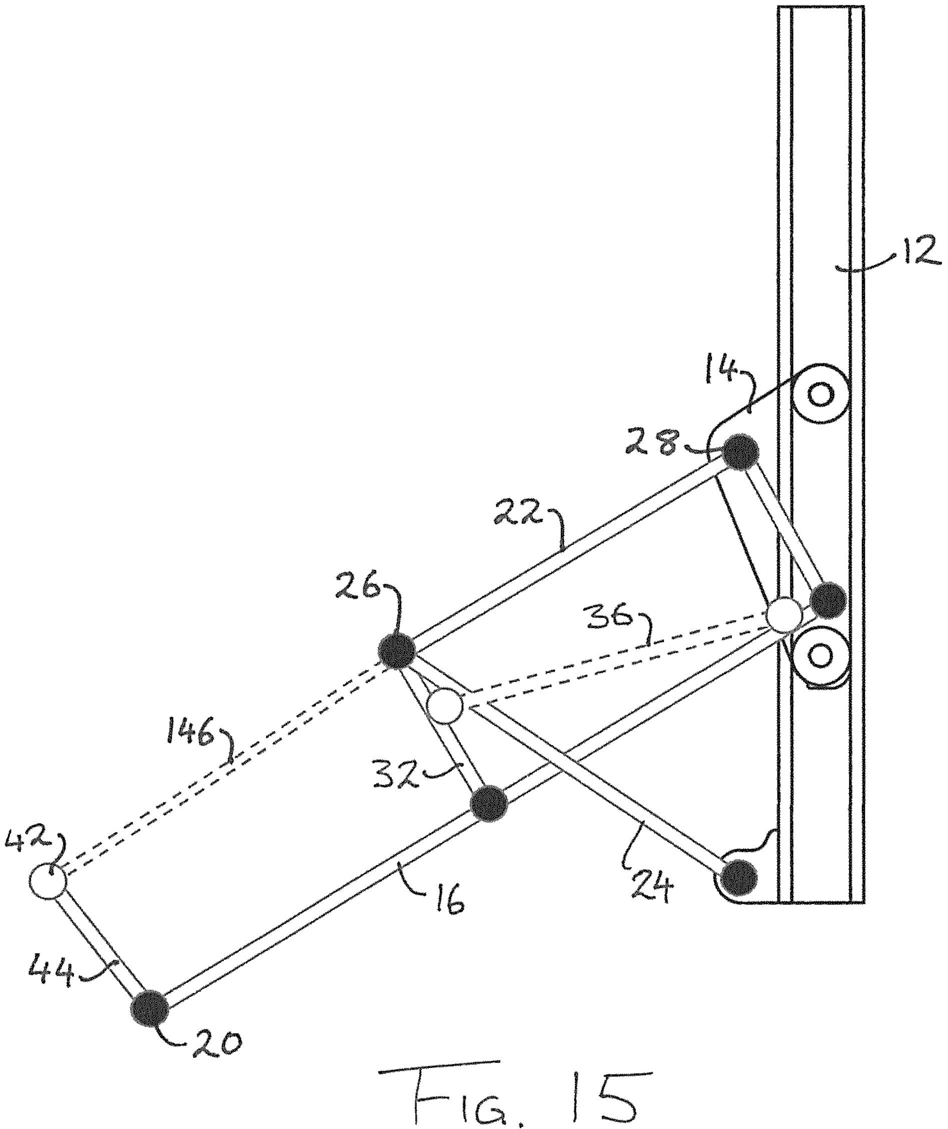
FIG. 15 is a schematic representation of a second embodiment of forklift reach mechanism, shown in the extended state.

A different embodiment is shown in FIG. 15, illustrated as in FIGS. 1-3 to show the geometry. For ease of understanding, this can be compared with FIG. 3. Like parts are indicated with like reference numerals and they need not be described again.

Whereas the embodiment of FIGS. 1-14 had a secondary support 46 in the form of a pair of tilt cylinders running from the carriage 14 to the forklift assembly 44, the embodiment of FIG. 15 has a secondary support 146, again in the form of a pair of tilt cylinders, running from the levelling assembly 22, 24, 26, to the forklift assembly.

Therefore the forklift assembly 44 is again supporte**4*d* by a main support 16 and a secondary support 146, and the secondary support 146 again provides an integrated tilt function that is always in tension, but the secondary support 146 in this case runs from the levelling assembly pivot point 26 (or one of the upper and lower arms 22, 24) to the pivot point 46 positioned on the forklift assembly above the connection point 20** for the main support.

As in the embodiment of FIGS. 1-14, the secondary support 146 tilt cylinders may be provided with appropriate bearings or other pivoting connections to allow both lateral and vertical pivoting, and thereby accommodate a side shift integrated with the forklift assembly (not shown).

The invention claimed is:

1. A forklift reach mechanism comprising:
- a vertical mast;
- a carriage that is movable vertically along the mast;
- a main support connected at a proximal end thereof to the carriage at a first pivoting connection and connected at a distal end thereof to a forklift assembly;
- a levelling assembly comprising upper and lower arms pivotally connected to each other at their distal ends, wherein the proximal end of the upper arm is connected to the carriage at a second pivoting connection, and the proximal end of the lower arm is connected at a fixed location relative to the mast below the carriage;
- a connecting member connected at one end to the levelling assembly adjacent the connection between the upper and lower arms, and at another end to the main support at an intermediate point along the main support between the proximal and distal ends thereof;
- an extensible actuating member connected between the carriage and the connecting member;
- wherein the first pivoting connection is below the second pivoting connection on the carriage;
- wherein the actuating member can be extended or retracted to drive the carriage vertically along the mast, thereby moving the forklift assembly towards or away from the mast.

2. A forklift reach mechanism according to claim 1, further comprising a secondary support connected at a distal end to the forklift assembly above the connection with the main support, and connected at a proximal end to one of the carriage, the levelling assembly or the connecting member, the secondary support being extensible and retractable to thereby tilt the forklift assembly by the relative movement between the connection points on the forklift assembly for the main and secondary supports.

3. A forklift reach mechanism according to claim 2, wherein the secondary support is pivotally connected at both proximal and distal ends such that it has freedom to pivot both vertically and laterally, allowing the forklift assembly to be shifted sideways relative to the main support.

4. A forklift reach mechanism according to claim 1, wherein the connection between the distal end of the main support and the forklift assembly is a sliding connection allowing the forklift assembly to slidably move laterally relative to the main support.

5. A forklift reach mechanism according to claim 4, further comprising a side shift actuator operable between the main support and the forklift to shift the forklift assembly laterally relative to the main support along the sliding connection.

6. A forklift reach mechanism according to claim 1, wherein a quadrilateral geometry is defined by the four points comprising (a) the first pivoting connection, (b) the second pivoting connection, (c) the connection between the upper arm and the connection member, and (d) the connection between the connecting member and the main support; wherein each of the distances (a)-(b), (b)-(c), (c)-(d) and (d)-(a) is fixed; and wherein the actuation of the extensible actuating member causes the angles at points (a) and (c) to open while the angles at points (b) and (d) close, or vice versa, with the lower arm restraining point (c) to follow an arcuate path relative to the fixed location at which it connects relative to the mast.

7. A forklift reach mechanism according to claim 1, wherein the upper and lower arms form a V-shaped assembly whose apex is at the point where the upper and lower arms meet, and wherein the actuation of the extensible actuating member causes the angle at the apex to respectively open or close as the carriage moves up or down the mast.

8. A forklift reach mechanism comprising:
- a vertical mast;
- a carriage that is movable vertically along the mast;
- a main support connected at a proximal end thereof to the carriage and connected at a distal end thereof to a forklift assembly;
- a levelling assembly connected between the carriage and the mast and to which the main support is connected at an intermediate point between the proximal and distal ends, the levelling assembly being movable to restrain the main support such that as the carriage and the proximal end of the main support are raised and lowered, the distal end of the main support extends and retracts along a horizontal path;
- a secondary support connected at a distal end to the forklift assembly above the connection with the main support, and connected at a proximal end to one of the carriage and the levelling assembly, the secondary support being extensible and retractable to thereby tilt the forklift assembly by the relative movement between the connection points on the forklift assembly for the main and secondary supports.

9. A forklift reach mechanism according to claim 8, wherein the levelling assembly comprises a pair of articulated arms connected at their respective proximal ends to the carriage and a fixed point relative to the mast, respectively, and connected to one another at their distal ends.

10. A forklift reach mechanism according to claim 9, wherein the levelling assembly further comprises a connecting member that connects the main support to the pair of articulated arms adjacent the connection between the distal ends of the arms.

11. A forklift reach mechanism according claim 8, wherein the secondary support is pivotally connected at both proximal and distal ends with freedom to pivot both vertically and laterally, allowing the forklift assembly to be shifted sideways relative to the main support.

12. A forklift reach mechanism according to claim 8, wherein the connection between the distal end of the main support and the forklift assembly is a sliding connection allowing the forklift assembly to slidably move laterally relative to the main support.

13. A forklift reach mechanism according to claim 12, further comprising a side shift actuator operable between the main support and the forklift to shift the forklift assembly laterally relative to the main support along the sliding connection.

* * * * *